US010822501B2

(12) United States Patent
Wang et al.

(10) Patent No.: US 10,822,501 B2
(45) Date of Patent: Nov. 3, 2020

(54) HEXAGONAL BORON NITRIDE EPOXY COMPOUND ANTICORROSIVE PAINT, AND PREPARATION METHOD AND USE THEREOF

(71) Applicant: Ningbo Institute of Materials Technology & Engineering, Chinese Academy of Sciences, Ningbo (CN)

(72) Inventors: Liping Wang, Ningbo (CN); Mingjun Cui, Ningbo (CN); Shihui Qiu, Ningbo (CN); Cheng Chen, Ningbo (CN); Songlv Qin, Ningbo (CN); Haichao Zhao, Ningbo (CN)

(73) Assignee: Ningbo Institute of Materials Technology & Engineering, Chinese Academy of Sciences, Ningbo (CN)

( * ) Notice: Subject to any disclaimer, the term of this patent is extended or adjusted under 35 U.S.C. 154(b) by 89 days.

(21) Appl. No.: 16/319,671

(22) PCT Filed: Dec. 6, 2016

(86) PCT No.: PCT/CN2016/108682
§ 371 (c)(1),
(2) Date: Jan. 22, 2019

(87) PCT Pub. No.: WO2018/090407
PCT Pub. Date: May 24, 2018

(65) Prior Publication Data
US 2020/0095432 A1 Mar. 26, 2020

(30) Foreign Application Priority Data

Nov. 17, 2016 (CN) .......................... 2016 1 1009592
Nov. 17, 2016 (CN) .......................... 2016 1 1017997

(51) Int. Cl.
| | |
|---|---|
| C09D 163/00 | (2006.01) |
| C09D 5/08 | (2006.01) |
| C09D 7/65 | (2018.01) |
| C09D 7/20 | (2018.01) |
| C09D 7/40 | (2018.01) |
| C09D 7/63 | (2018.01) |
| B32B 27/38 | (2006.01) |
| B32B 15/092 | (2006.01) |

(52) U.S. Cl.
CPC ............... *C09D 5/082* (2013.01); *C09D 7/20* (2018.01); *C09D 7/63* (2018.01); *C09D 7/65* (2018.01); *C09D 7/70* (2018.01); *C09D 163/00* (2013.01)

(58) Field of Classification Search
None
See application file for complete search history.

(56) References Cited

U.S. PATENT DOCUMENTS

| | | | | |
|---|---|---|---|---|
| 2008/0166563 A1* | 7/2008 | Brittingham | ............... | C08J 3/18 |
| | | | | 428/411.1 |
| 2011/0086965 A1* | 4/2011 | Zhi | ..................... | C01B 21/0648 |
| | | | | 524/404 |
| 2013/0327992 A1* | 12/2013 | Edgington | ......... | C08G 59/5033 |
| | | | | 252/389.24 |
| 2017/0260054 A1* | 9/2017 | Yu | ......................... | C01B 32/184 |

FOREIGN PATENT DOCUMENTS

| | | | | |
|---|---|---|---|---|
| CN | 102702920 A | * | 10/2012 | ........... C09D 163/00 |
| WO | WO-2016086796 A1 | * | 6/2016 | ............. C01B 32/20 |

OTHER PUBLICATIONS

Machine translation of CN-102702920-A (no date).*

* cited by examiner

*Primary Examiner* — Michael J Feely
(74) *Attorney, Agent, or Firm* — Wang Law Firm, Inc.

(57) ABSTRACT

The present disclosure discloses a hexagonal boron nitride epoxy compound anticorrosive paint, and a preparation method and use thereof. The anticorrosive paint mainly comprises hexagonal boron nitride, an oligoaniline or polyaniline nanofiber, an epoxy resin, a dispersing medium, a paint additive, an epoxy resin curing agent, and a solvent. The hexagonal boron nitride epoxy compound anticorrosive paint provided by the present disclosure has the advantages, such as good stability, simple preparation process, and low cost, does not tend to precipitate, is suitable for large-scale production, forms a coating that has excellent barrier properties and lasting corrosion resistance, and has very good application prospects in the industries, such as chemical industry, petroleum, electric power, shipping, light textile, storage, transport, and spaceflight.

15 Claims, 8 Drawing Sheets

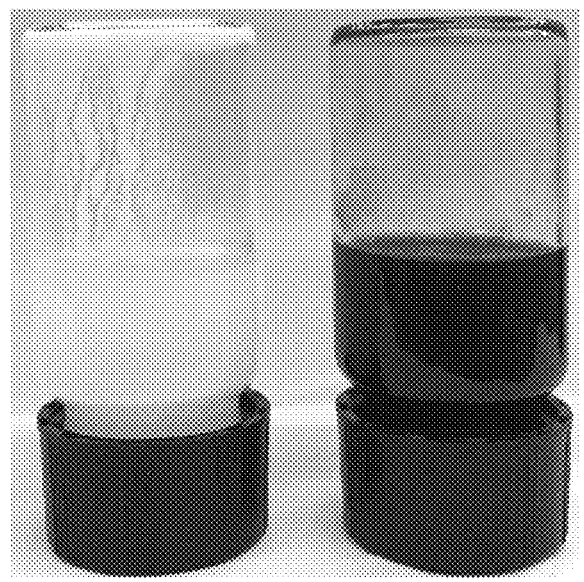
Fig. 8a          Fig. 8b
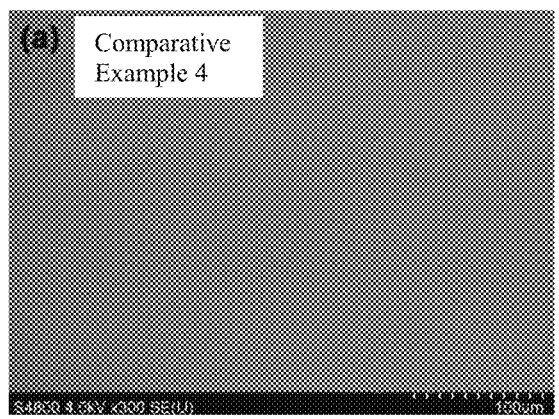 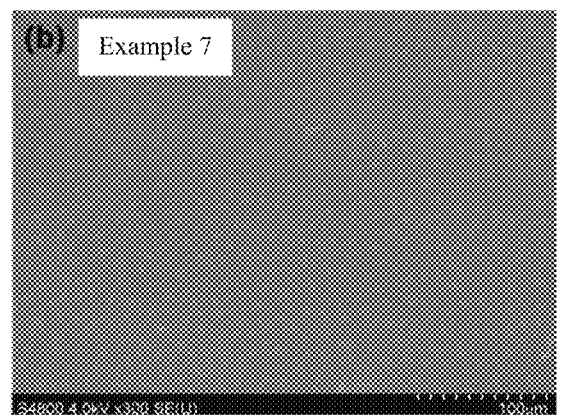
Fig. 9a          Fig. 9b
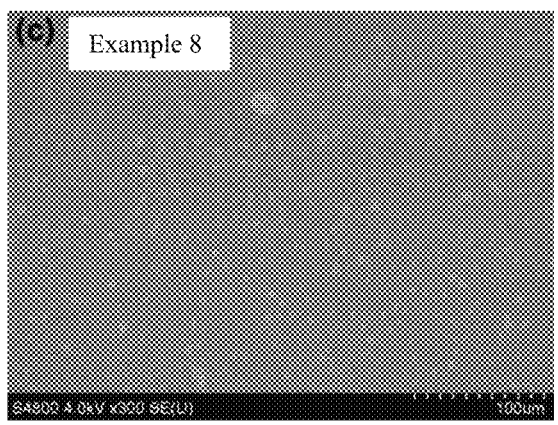 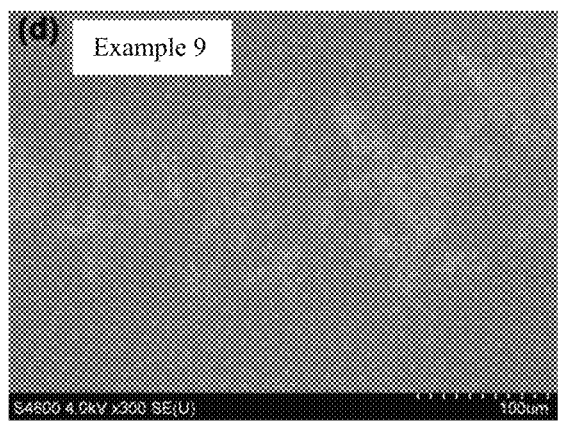
Fig. 9c          Fig. 9d

HEXAGONAL BORON NITRIDE EPOXY COMPOUND ANTICORROSIVE PAINT, AND PREPARATION METHOD AND USE THEREOF

TECHNICAL FIELD

The present disclosure relates to an epoxy paint, specifically relates to a hexagonal boron nitride epoxy compound anticorrosive paint, and a preparation method and use thereof, and belongs to the technical field of paint.

BACKGROUND

Corrosion causes huge direct losses to metal materials, which are mainly reflected in two aspects. First, according to economic statistics, about one million tons of metals are scrapped due to corrosion around the world each year, accounting for 20% to 40% of the annual output; and with the acceleration of the industrialization process, the corrosion problems are increasingly serious, and it is estimated that the steel equipment scrapped due to corrosion around the world each year is equivalent to 30% of the annual output, thereby resulting in serious economic losses. Second, the great harm of corrosion is not only reflected in economic losses, but also will bring heavy casualties, environmental pollution, and resource wastes, hinders the development of new technologies, and promotes the depletion of natural resources. People have increasingly recognized and attached importance to the serious harms caused by metal corrosion to the national economy and social life.

At present, the coating technique of the surface coating (organic coating and inorganic coating) is a general measure for corrosion protection, and particularly, the organic coating is widely used because of its advantages, such as simple preparation process, low cost, and suitable for large-scale production. The protective effect of the organic coating on a metal mainly includes physical barrier, passivation, antirust filler protection, cathodic protection effect, and the like. However, the organic coating material is not a perfect barrier system, because the molecular chain gap of the polymer will enable the pores produced by the coating, as well as the pores produced by the solvent evaporation in the coating process, to become the main channels for infiltration of the water vapor, salt mist and other corrosive media. In order to delay the occurrence of corrosion, conventional heavy anticorrosive paints generally contain chromium, lead, or other heavy metal compounds as corrosion inhibitors, thereby causing great impacts on the marine environment and human health. As people enhance their awareness of environmental protection and health, developing environmentally friendly and non-toxic rustproof pigments, fillers, and anticorrosive paints free of heavy metals becomes an inevitable trend of paint development.

In another aspect, hexagonal boron nitride has excellent chemical stability, thermal stability, hydrophobicity, barrier property, thermal conductivity, lubricity and mechanical property, and particularly further has an insulating property. If it is used in a paint, the paint may have good corrosion resistance. However, when hexagonal boron nitride is directly added to a high molecular polymer or resin, hexagonal boron nitride tends to agglomerate due to $\pi$-$\pi$ conjugate action and van der Waals force adsorption, and it is difficult to uniformly disperse it in the high molecular polymer or resin, so that the micropores are still present, and the formed coating has poor protection effects.

SUMMARY

A main object of the present disclosure is to provide a hexagonal boron nitride epoxy compound anticorrosive paint, and a preparation method and use thereof, to overcome the disadvantages of the prior art.

In order to achieve the object of the disclosure, the technical solution employed in the present disclosure comprises:

An example of the present disclosure provides a hexagonal boron nitride epoxy compound anticorrosive paint, comprising:

a first component, comprising hexagonal boron nitride, an epoxy resin, an oligoaniline or a polyaniline nanofiber, a paint additive, and a solvent; and a second component, comprising a curing agent.

In some embodiments, the hexagonal boron nitride epoxy compound anticorrosive paint may include:

the first component, comprising hexagonal boron nitride, the epoxy resin, the oligoaniline, the paint additive, and the solvent, wherein at least a part of the oligoaniline binds to hexagonal boron nitride by a physical action to enable hexagonal boron nitride to be uniformly dispersed in the paint; and the second component, comprising the curing agent.

Furthermore, in the above embodiments, the content of hexagonal boron nitride in the paint is preferably 0.5 wt %-2 wt %.

Furthermore, in some preferred embodiments of the above embodiments, the paint specifically includes:

the first component, comprising: 80 to 95 parts by weight of the epoxy resin, 0.5 to 2 parts by weight of hexagonal boron nitride, 0.25 to 1 part by weight of the oligoaniline, and 5 to 15 parts by weight of the paint additive; and the second component, comprising: 75 to 100 parts by weight of the curing agent, and 0 to 25 parts by weight of the solvent; and a mass ratio of the first component to the second component is 100:10 to 100:80.

In some embodiments, the hexagonal boron nitride epoxy compound anticorrosive paint may also include the components, such as hexagonal boron nitride, a polyaniline nanofiber, an epoxy resin, a dispersing medium, a paint additive, an epoxy resin curing agent, and a solvent.

Furthermore, in the above embodiments, the content of hexagonal boron nitride in the hexagonal boron nitride epoxy compound anticorrosive paint is preferably 0.5 to 2 wt %.

Furthermore, in the above embodiments, the content of the polyaniline nanofiber in the hexagonal boron nitride epoxy compound anticorrosive paint is preferably 0.25 wt % to 1 wt %.

Furthermore, in some preferred embodiments of the above embodiments, the hexagonal boron nitride epoxy compound anticorrosive paint includes:

the first component, comprising: 50 to 79 wt % epoxy resin, 0.5 to 2 wt % hexagonal boron nitride, 0.25 to 1 wt % polyaniline nanofiber, 0.5 to 5 wt % paint additive, and 20 to 30 wt % solvent; and the second component, comprising: 75 to 100 wt % epoxy resin curing agent, and 0 to 25 wt % solvent; and a mass ratio of the first component to the second component is 100:10 to 100:80.

An example of the present disclosure further provides a preparation method of a hexagonal boron nitride epoxy compound anticorrosive paint, comprising:

providing a first component, comprising: mixing hexagonal boron nitride with an oligoaniline or polyaniline nanofiber in a solvent, to give a hexagonal boron nitride dispersion, and then uniformly mixing the hexagonal boron nitride dispersion with an epoxy resin and a paint additive; and providing a second component, comprising a curing agent or a mixture of the curing agent and the solvent.

In some embodiments, the preparation method may include:

providing the first component, comprising: mixing hexagonal boron nitride with the oligoaniline in the solvent, to give the hexagonal boron nitride dispersion, and then uniformly mixing the hexagonal boron nitride dispersion with the epoxy resin and the paint additive; and providing the second component, comprising the curing agent or a mixture of the curing agent and the solvent.

In some embodiments, the preparation method may further include:

uniformly dispersing hexagonal boron nitride and the polyaniline nanofiber in the solvent to give the hexagonal boron nitride dispersion, and then uniformly mixing the hexagonal boron nitride dispersion with then epoxy resin, the additive, and the solvent, to form the first component; and providing an epoxy resin curing agent as the second component, or diluting the epoxy resin curing agent with the solvent to form the second component.

Furthermore, the oligoaniline is also known as an aniline oligomer, an aniline conjugated chain segment contained therein is shorter than a polyaniline, and its electroactivity is similar to that of the polyaniline. However, it has no defects in its molecule, and has better solubility. The oligoaniline applicable to the present disclosure includes, but is not limited to, any one or a combination of more of aniline trimer, aniline tetramer, aniline pentamer, and aniline hexamer. The oligoanilines may be obtained from commercially available approaches, or independently prepared by referring to references (e.g., *CHEM. COMMUN.*, 2003, pp. 2768-2769; *Synthetic Metals*, 2001, Vol. 122, pp. 237-242; CN101811997A; CN 1369478A, or CN 1204655A).

Furthermore, a material of the polyaniline nanofiber may be selected from the group consisting of polyaniline and polyaniline having a substituent-containing side chain; preferably, the substituent includes methyl, ethyl, propyl, or butyl; and preferably, the polyaniline having a substituent-containing side chain includes, but is not limited to, any one or a combination of more of poly-o-methylaniline, poly-o-ethylaniline, p-o-propylaniline, polybutylaniline, and the like.

Furthermore, the hexagonal boron nitride includes, but is not limited to, any one of or a derivative of any one of hexagonal boron nitride nanosheet, hexagonal boron nitride microsheet, hexagonal boron nitride nanoribbon, few-layer hexagonal boron nitride (2 to 5 layers), multi-layer hexagonal boron nitride (5 to 9 layers), and hexagonal boron nitride quantum dot (e.g., hydroxylated boron nitride, dopamine, boron nitride, and the like).

Furthermore, the epoxy resin includes, but is not limited to, any one or a combination of more of bisphenol A epoxy resin, bisphenol F epoxy resin, bisphenol S epoxy resin, hydroxymethyl bisphenol F epoxy resin, hydrogenated bisphenol F epoxy resin, nylon modified epoxy resin, linear phenol formaldehyde epoxy resin, o-cresol formaldehyde epoxy resin, aliphatic glycidyl ether epoxy resin, glycidyl ester epoxy resin, and glycidyl amine epoxy resin.

Furthermore, the curing agent (also known as epoxy resin curing agent) includes, but is not limited to, polyamide curing agent, cardanol curing agent, anhydride curing agent, imidazole curing agent, and the like.

Furthermore, the paint additive includes, but is not limited to, any one or a combination of more of antisettling agent, defoamer, and flatting agent.

Furthermore, the solvent includes, but is not limited to, any one or a combination of more of toluene, xylene, acetone, tetrahydrofuran, ethanol, ethyl acetate, and dimethyl sulfoxide.

An example of the present disclosure further provides a hexagonal boron nitride epoxy compound anticorrosive paint made by any one of the above methods.

An example of the present disclosure further provides use of the hexagonal boron nitride epoxy compound anticorrosive paint.

An example of the present disclosure further provides a coating formed by the hexagonal boron nitride epoxy compound anticorrosive paint, especially an anticorrosive and wear-resistant coating.

An example of the present disclosure further provides a method for preparing the coating.

Compared with the prior art, the hexagonal boron nitride epoxy compound anticorrosive paint provided by the present disclosure has the advantages, such as good stability, simple preparation process, and low cost, does not tend to precipitate, is suitable for large-scale production, forms a coating that has excellent barrier properties and lasting corrosion resistance, and has very good application prospects in the industries, such as chemical industry, petroleum, electric power, shipping, light textile, storage, transport, and spaceflight.

BRIEF DESCRIPTION OF THE DRAWINGS

FIGS. 8a to 8b are respectively a photo of dispersion of hexagonal boron nitride without dispersion processing by polybutylaniline nanofiber in a solvent and a photo of dispersion of hexagonal boron nitride processed by polybutylaniline nanofiber in a solvent in Example 7 of the present disclosure.

FIGS. 9a to 9d are respectively a transmission electron micrograph of a pure epoxy coating in Comparative Example 4 and transmission electron micrographs of hexagonal boron nitride epoxy compound coatings obtained in Example 7 to Example 9.

DETAILED DESCRIPTION OF EMBODIMENTS

Figure 1A:
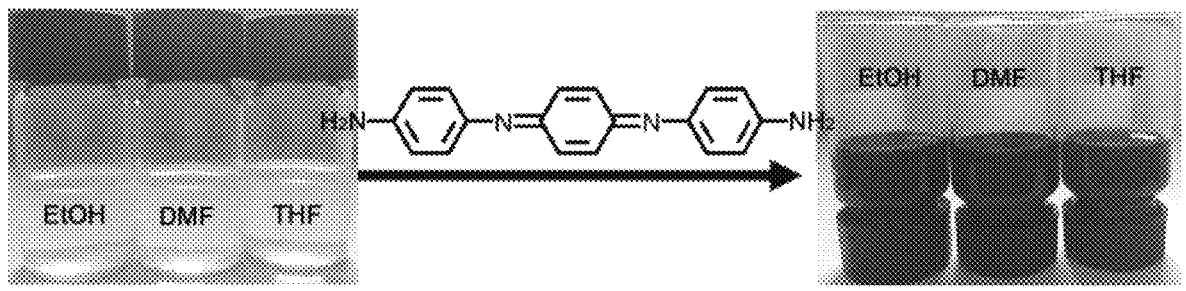
FIG. 1*a* is photos of hexagonal boron nitride before and after dispersion in a solvent and oligoaniline according to a typical embodiment of the present disclosure.
Figure 1B:
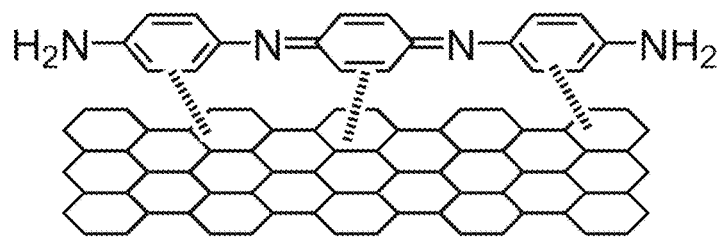
FIG. 1*b* is a schematic diagram of the binding of aniline trimer with hexagonal boron nitride.

A hexagonal boron nitride epoxy compound anticorrosive paint provided in a first aspect of an example of the present disclosure comprises:

a first component, comprising hexagonal boron nitride, an epoxy resin, an oligoaniline or a polyaniline nanofiber, a paint additive, and a solvent; and a second component, comprising a curing agent.

In some embodiments, the hexagonal boron nitride epoxy compound anticorrosive paint may include:

the first component, comprising hexagonal boron nitride, the epoxy resin, the oligoaniline, the paint additive, and the solvent, wherein at least a part of the oligoaniline binds to hexagonal boron nitride by a physical action to enable hexagonal boron nitride to be uniformly dispersed in the paint; and the second component, comprising the curing agent.

Furthermore, in the above embodiments, the content of hexagonal boron nitride in the paint is preferably 0.5 wt %-2 wt %.

Furthermore, in the above embodiments, a mass ratio of hexagonal boron nitride to the oligoaniline in the paint is preferably 1:10 to 10:1.

Furthermore, in the above embodiments, a content of the oligoaniline in the paint is preferably 0.25 to 1 wt %.

In some specific preferred embodiments, the paint specifically comprises:

the first component, comprising: 80 to 95 parts by weight of the epoxy resin, 0.5 to 2 parts by weight of hexagonal boron nitride, 0.25 to 1 part by weight of the oligoaniline, and 5 to 15 parts by weight of the paint additive; and the second component, comprising: 75 to 100 parts by weight of the curing agent, and 0 to 25 parts by weight of the solvent; and a mass ratio of the first component to the second component is 100:10 to 100:80.

Furthermore, in the above embodiments, the oligoaniline and hexagonal boron nitride are uniformly dispersed in the hexagonal boron nitride epoxy compound anticorrosive paint in a form of compound.

In some other embodiments, the hexagonal boron nitride epoxy compound anticorrosive paint may also include the components, such as hexagonal boron nitride, a polyaniline nanofiber, an epoxy resin, a dispersing medium, a paint additive, an epoxy resin curing agent, and a solvent.

Furthermore, in the above embodiments, the content of hexagonal boron nitride in the hexagonal boron nitride epoxy compound anticorrosive paint is preferably 0.5 to 2 wt %.

Furthermore, in the above embodiments, the content of the polyaniline nanofiber in the hexagonal boron nitride epoxy compound anticorrosive paint is preferably 0.25 wt % to 1 wt %.

In some specific preferred embodiments, the paint specifically comprises:

the first component, comprising: 50 to 79 wt % epoxy resin, 0.5 to 2 wt % hexagonal boron nitride, 0.25 to 1 wt % polyaniline nanofiber, 0.5 to 5 wt % paint additive, and 20 to 30 wt % solvent; and the second component, comprising: 75 to 100 wt % epoxy resin curing agent, and 0 to 25 wt % solvent; and a mass ratio of the first component to the second component is 100:10 to 100:80.

In the above embodiments, before using the hexagonal boron nitride epoxy compound anticorrosive paint, the first component can be uniformly mixed with the second component, followed by film formation processing and other operations.

Furthermore, in the above embodiments, the polyaniline nanofiber and hexagonal boron nitride are uniformly dispersed in the hexagonal boron nitride epoxy compound anticorrosive paint in a form of compound.

A method for preparing the hexagonal boron nitride epoxy compound anticorrosive paint provided in another aspect of an example of the present disclosure comprises:

providing a first component, comprising: mixing hexagonal boron nitride with an oligoaniline or polyaniline nanofiber in a solvent, to give a hexagonal boron nitride dispersion, and then uniformly mixing the hexagonal boron nitride dispersion with an epoxy resin and a paint additive; and providing a second component, comprising a curing agent or a mixture of the curing agent and the solvent.

In some embodiments, the preparation method may include:

providing the first component, comprising: mixing hexagonal boron nitride with the oligoaniline in the solvent, to give the hexagonal boron nitride dispersion, and then uniformly mixing the hexagonal boron nitride dispersion with the epoxy resin and the paint additive; and providing the second component, comprising the curing agent or a mixture of the curing agent and the solvent.

In some specific preferred embodiments, the preparation method may further comprise: dispersing hexagonal boron nitride and oligoaniline in the solvent, to give the hexagonal boron nitride dispersion by stirring or ultrasonic processing, and then mixing the hexagonal boron nitride dispersion with the epoxy resin and the paint additive, to give the first component.

Furthermore, in the above embodiments, the operations, such as stirring, and dispersion, may be implemented using general high-speed stirring, mixing, and dispersing devices, such as an ultrasonic cleaner, an ultrasonic cell disrupter, a high-speed stirrer, a mechanical stirrer, and the like.

Furthermore, in the above embodiments, the content of hexagonal boron nitride in the paint is preferably 0.5 wt % to 2 wt %.

Furthermore, in the above embodiments, a mass ratio of hexagonal boron nitride to the oligoaniline in the paint is preferably 1:10 to 10:1.

Furthermore, in some preferred embodiments of the above embodiments, the paint may further include:

the first component, comprising: 80 to 95 parts by weight of the epoxy resin, 0.5 to 2 parts by weight of hexagonal boron nitride, 0.25 to 1 part by weight of the oligoaniline, and 5 to 15 parts by weight of the paint additive; and the second component, comprising: 75 to 100 parts by weight of the curing agent, and 0 to 25 parts by weight of the solvent; and a mass ratio of the first component to the second component is 100:10 to 100:80.

In some more specific preferred embodiments, the paint includes following components:

the first component, comprising following components (by wt %): 80 to 95 of the epoxy resin, 0.5 to 2 of hexagonal boron nitride, 0.25 to 1 of the oligoaniline, and 5 to 15 of the paint additive; and the second component, comprising following components (by wt %): 75 to 100 of the curing agent, and 0 to 25 of the solvent.

In one typical specific embodiment, the preparation method specifically includes following steps:

(1) 2.956 g of p-phenylenediamine sulfate, 1.853 g of aniline, and 150 mL of HCl solution (1 mol/L) were added to a round bottom flask equipped with a magnetic stirrer, and cooled in an ice-salt bath at −5° C. In addition, 4.541 g of ammonium persulfate was weighed, and dissolved in 50 mL of HCl solution (1 mol/L), slowly added dropwise to the reaction mixture through a dropping funnel at a rate of about 1 drop/sec, and then further stirred for 1 hr until the dropwise addition was completed. After the reaction was completed, the product was suction-filtered through a Buchner funnel, and washed with 1 mol/L HCl solution pre-cooled to 0° C., and then washed with plenty of deionized water, to give a dark green solid product. The product was first washed with 10 wt % aqueous ammonia, then rinsed with plenty of deionized water, and finally dried in a vacuum oven at 70° C., to give aniline trimer as a purple red solid product.

(2) Weighed hexagonal boron nitride and oligoaniline at a mass ratio of 4:1 were dispersed in a solvent (EtOH, DMF, THF, or the like) to form a dispersion of oligoaniline/hexagonal boron nitride (see the right figure in FIG. 1a. If the oligoaniline was not added, the left figure in FIG. 1a can be referred to for the effect).

(3) The dispersion of oligoaniline/hexagonal boron nitride was added to the epoxy resin and additive, and stirred for 10 to 60 min, to give a uniformly mixed first component.

(4) A curing agent was diluted with a solvent, to give a second component of the hexagonal boron nitride compound epoxy paint.

Furthermore, in the above typical embodiments, the second component is added to the first component, fully mixed, and cured at room temperature for about 7 days, to form a hexagonal boron nitride anticorrosive and wear-resistant coating.

In some embodiments, the preparation method may also include:

uniformly dispersing hexagonal boron nitride and the polyaniline nanofiber in the solvent to give the hexagonal boron nitride dispersion, and then uniformly mixing the hexagonal boron nitride dispersion with the epoxy resin, the additive, and the solvent, to form the first component; and providing an epoxy resin curing agent as the second component, or diluting the epoxy resin curing agent with the solvent to form the second component.

In some preferred embodiments, the preparation method may also include:

weighing certain amounts of hexagonal boron nitride and polyaniline nanofiber, dispersing in a solvent, and stirring or ultrasonically processing, to give a hexagonal boron nitride dispersion;

adding the hexagonal boron nitride dispersion to the epoxy resin, the additive, and the solvent, and stirring for 10 to 60 min, to give a uniformly mixed first component; and diluting the epoxy resin curing agent with a certain amount of the solvent, to give the second component.

Furthermore, in some preferred embodiments of the above embodiments, a mass ratio of hexagonal boron nitride to the polyaniline nanofiber in the hexagonal boron nitride dispersion is preferably 1:10 to 10:1.

Likewise, in the above embodiments, the operations, such as stirring, and dispersion, may be implemented using general high-speed stirring, mixing, and dispersing devices, such as an ultrasonic cleaner, an ultrasonic cell disrupter, a high-speed stirrer, a mechanical stirrer, and the like.

In one typical specific embodiment, the preparation method specifically includes following steps:

(1) dissolving aniline monomer in 1 M hydrochloric acid, adding an equimolar amount of ammonium persulfate to the above solution, leaving to stand at room temperature for 24 hr, filtering, and washing, to give a polyaniline nanofiber, adding hydrazine hydrate for doping, washing with distilled water 3 times, and drying, to give eigenstate polyaniline nanofiber.

(2) weighing certain amounts of hexagonal boron nitride and polyaniline nanofiber obtained in the step (1), dispersing in a solvent, and forming a dispersion of polyaniline nanofiber/hexagonal boron nitride, wherein a mass ratio of the polyaniline nanofiber to hexagonal boron nitride is 1:10 to 10:1.

(3) adding the dispersion of polyaniline nanofiber/hexagonal boron nitride to an epoxy resin, an additive, and a solvent, and stirring for 10 to 60 min, to give a uniformly mixed first component.

(4) diluting the epoxy resin curing agent with a solvent, to give a second component.

Furthermore, in the above typical embodiments, the second component and the first component at a certain ratio may be uniformly mixed, applied on a substrate to form a coating, and cured at room temperature for 7 days, to form a hexagonal boron nitride epoxy compound coating.

Furthermore, in the present specification, the oligoaniline includes, but is not limited to, any one or a combination of more of aniline trimer, aniline tetramer, aniline pentamer, and aniline hexamer.

Furthermore, in the present specification, a material of the polyaniline nanofiber may be selected from the group consisting of polyaniline and polyaniline having a substituent-containing side chain. Preferably, the substituent includes methyl, ethyl, propyl, or butyl. Preferably, the polyaniline having a substituent-containing side chain includes, but is not limited to, any one or a combination of two or more of poly-o-methylaniline, poly-o-ethylaniline, p-o-propylaniline, and polybutylaniline.

Furthermore, in the present specification, a diameter of the polyaniline nanofiber is preferably 10-300 nm, particularly preferably 10-100 nm.

Furthermore, in the present specification, a length of the polyaniline nanofiber is preferably 0.5~5 μm, particularly preferably 0.5~2 μm.

Furthermore, in the present specification, each of the polyaniline and polyaniline having a substituent-containing side chain is eigenstate polyaniline.

Furthermore, in the present specification, the polyaniline nanofiber may be made by a method in the industrial circle.

Furthermore, in the present specification, the hexagonal boron nitride includes, but is not limited to, any one of or a derivative of any one of hexagonal boron nitride nanosheet, hexagonal boron nitride microsheet, hexagonal boron nitride nanoribbon, few-layer hexagonal boron nitride (2 to 5 layers), multi-layer hexagonal boron nitride (5 to 9 layers), and hexagonal boron nitride quantum dot (e.g., chemically modified hexagonal boron nitride).

Furthermore, in the present specification, a thickness of the hexagonal boron nitride is preferably 20 nm or less, and particularly preferably 0.33 nm to 10 nm.

Furthermore, in the present specification, the epoxy resin includes, but is not limited to, any one or a combination of more of bisphenol A epoxy resin, bisphenol F epoxy resin, bisphenol S epoxy resin, hydroxymethyl bisphenol F epoxy resin, hydrogenated bisphenol F epoxy resin, nylon modified epoxy resin, linear phenol formaldehyde epoxy resin, o-cresol formaldehyde epoxy resin, aliphatic glycidyl ether epoxy resin, glycidyl ester epoxy resin, glycidyl amine epoxy resin, and the like.

Furthermore, in the present specification, the curing agent (also known as epoxy resin curing agent) includes, but is not limited to, polyamide curing agent, cardanol curing agent, anhydride curing agent, imidazole curing agent, and the like.

Furthermore, in the present specification, the paint additive includes, but is not limited to, any one or a combination of more of antisettling agent, defoamer, and flatting agent. These paint additives can all be known types in the industrial circle, and can be obtained from known approaches in the industrial circle, such as buying from commercially available channels.

For example, the antisettling agent may be preferably selected from the group consisting of, but is not limited to, any one or a combination of more of fumed silica, polyamide wax, and organobentonite.

For example, the defoamer may be preferably selected from the group consisting of, but is not limited to, any one or a combination of more of simethicone, esterified and etherfied compound, modified mineral oil, polyethoxy glycerol ether, micromolecular metallorganics, and modified organosilicon polymer.

For example, the flatting agent may be preferably selected from the group consisting of, but is not limited to, any one or a combination of more of butyl cellosolve, cellaburate, polyacrylate, silicone oil, hydroxymethyl cellulose, polydimethylsilane, polymethylphenylsiloxane, and modified organosilicon compound.

Furthermore, in the present specification, the solvent may be preferably selected from the group consisting of, but is not limited to, any one or a combination of more of toluene, xylene, acetone, tetrahydrofuran, ethanol, ethyl acetate, and dimethyl sulfoxide.

Another aspect of an example of the present disclosure further provides use of the hexagonal boron nitride epoxy compound anticorrosive paint.

Accordingly, an example of the present disclosure further provides a coating formed by the hexagonal boron nitride epoxy compound anticorrosive coating, especially an anticorrosive and wear-resistant coating.

In some embodiments, a preferred mass percent of the oligoaniline in the coating is 0.25 to 1%, and a preferred mass percent of hexagonal boron nitride is 0.5 to 2%.

Accordingly, an example of the present disclosure further provides a coating, especially a preparation method of an anticorrosive and wear-resistant coating, comprising: uniformly mixing the first component and the second component of the hexagonal boron nitride epoxy compound anticorrosive paint for film formation processing, and then curing at room temperature to form the coating.

In some specific embodiments, the first component and the second component of the hexagonal boron nitride epoxy compound anticorrosive paint may be uniformly mixed, applied on a substrate, and then cured at room temperature to form the anticorrosive and wear-resistant coating.

In some specific embodiments, the second component and the first component may be mixed for film formation processing, and cured at room temperature for 7 days or more, to give the hexagonal boron nitride epoxy compound coating.

The film formation processing may include, but is not limited to, coating, spin coating, spray coating, printing, and the like.

The substrate may be made from a variety of materials, e.g., a metal substrate. In particular, when the hexagonal boron nitride epoxy compound coating is applied on the surface of a substrate, such as a metal, the service life of such a substrate can be significantly extended.

Some of the above embodiments of the present disclosure greatly improve, by physical recombination of an oligoaniline with hexagonal boron nitride, the dispersion stability of hexagonal boron nitride, enable hexagonal boron nitride not only to be uniformly and stably dispersed in an epoxy resin to form a hexagonal boron nitride epoxy compound anticorrosive and wear-resistant paint that has the advantages, such as good storage stability, and does not tend to precipitate, but also to be distributed in parallel or overlapped in the epoxy compound coating, and produce labyrinth effects, thereby greatly improving the barrier properties of the coating, reducing cracks of the coating, extending the diffusion channels of the corrosive medium, and thus delaying the corrosion of metals; and can also more effectively passivate metals by recombination of hexagonal boron nitride with the oligoaniline, further inhibit the corrosion of metals, and further significantly increase the wear resistance of the coating, so that the resulting coating has good barrier properties, and lasting corrosion resistance and wear resistance.

Some other embodiments of the above embodiments of the present disclosure can significantly improve the barrier properties and corrosion resistance of the formed coating by adding a small amount of uniformly dispersed polyaniline nanofiber and hexagonal boron nitride (especially two-dimensional hexagonal boron nitride nanosheet) to the hexagonal boron nitride epoxy compound anticorrosive paint. The mechanism thereof may be as follows: first, the polyaniline nanofiber can passivate metal surfaces to form a protective oxide layer, and the conductivity of the polyaniline nanofiber can lead to migration of corrosion potentials, thereby reducing the corrosion rate of metals; second, uniform dispersion of hexagonal boron nitride (preferably two-dimensional hexagonal boron nitride nanosheet) enables it to be distributed in parallel or overlapped in the compound coating, produce labyrinth effects, thereby greatly improving the barrier properties of the coating, reducing cracks of the coating, extending the diffusion channels of the corrosive medium, and thus delaying the corrosion of metals; third, after recombination of the polyaniline nanofiber with hexagonal boron nitride (preferably two-dimensional hexagonal boron nitride nanosheet), the synergy of both not only will not affect the above excellent performances of the polyaniline nanofiber and hexagonal boron nitride, but also can significantly improve the dispersity of hexagonal boron nitride, enables it to be more uniformly dispersed in the epoxy resin, and then enables the formed coating to be more compact, and achieve significantly improved protective effects.

In conclusion, the hexagonal boron nitride epoxy compound anticorrosive paint of the present disclosure has the advantages, such as good stability, does not tend to precipitate, forms a coating that has excellent barrier properties and lasting corrosion resistance and wear resistance, and has extensive application prospects in the industries, such as architecture, chemical industry, petroleum, electric power, metallurgical industry, shipping, light textile, storage, transport, and spaceflight.

To make the objects, the technical solutions, and the advantages of the present disclosure clearer, the technical solutions in the examples of the present disclosure will be illustrated in detail hereinafter in conjunction with some examples and the accompanying drawings. Obviously, only a part of the examples, instead of all examples, of the present disclosure are presented. All other examples concluded by those with ordinary skills in the art based on the examples of the present disclosure without making inventive labor fall within the scope of protection of the present disclosure.

Comparative Example 1

20 g of epoxy resin (model E44, purchased from Wujiang Heli Resin Factory), 1 g of flatting agent (polydimethylsiloxane), 1 g of antisettling agent (polyamide wax), 2 g of defoamer (modified organosilicone compound), and 6 g of xylene were weighed, and magnetically stirred for 30 min, to give a first component (i.e., the first component). 5 g of polyamide 650 and 4 g of xylene solution were uniformly mixed, to give a second component (i.e., the second component). The first component and the second component were mixed at a ratio of 4:1, and stirred by a high speed stirrer for 30 min, to give a pure epoxy paint. The resulting pure epoxy paint was sprayed onto a carbon steel substrate, to evaporate the solvent, and then give a pure epoxy coating having a thickness of about 20 μm.

Example 1

0.031 g of aniline dimer and 0.13 g of hexagonal boron nitride nanosheet (commercially available, thickness: about 0.33 nm to 2 nm) were weighed and dispersed in 25 mL of tetrahydrofuran, and ultrasonically processed for 1 hr, to give a hexagonal boron nitride dispersion. The hexagonal boron nitride dispersion was added to 20 g of epoxy resin, 1 g of flatting agent (polydimethylsiloxane), 1 g of antisettling agent (polyamide wax), 2 g of defoamer (modified organosilicone compound), and 6 g of xylene, and magnetically stirred for 30 min, to uniformly mix the substances, and give a first component. 5 g of polyamide 650 and 4 g of xylene solution were uniformly mixed, to give a second component. The first component and the second component were mixed at a ratio of 4:1, and stirred using a high speed stirrer for 30 min, to give a hexagonal boron nitride epoxy compound anticorrosive paint (i.e., the hexagonal boron nitride epoxy compound anticorrosive paint) containing 0.5 wt % hexagonal boron nitride. The resulting hexagonal boron nitride epoxy compound anticorrosive paint was sprayed onto a carbon steel substrate, to evaporate the solvent, and then give a hexagonal boron nitride epoxy compound coating (i.e., the hexagonal boron nitride anticorrosive and wear-resistant coating) having a thickness of about 20 μm.

Example 2

0.063 g of aniline trimer and 0.25 g of hexagonal boron nitride nanosheet (commercially available, thickness: about 6 nm to 10 nm) were weighed and dispersed in 50 mL of tetrahydrofuran, and ultrasonically processed for 1 hr, to give a hexagonal boron nitride dispersion. The hexagonal boron nitride dispersion was added to 20 g of epoxy resin, 2 g of flatting agent (polydimethylsiloxane), 2 g of antisettling agent (polyamide wax), 2 g of defoamer (modified organosilicone compound), and 6 g of toluene (model E44, purchased from Wujiang Heli Resin Factory), and magnetically stirred for 30 min, to uniformly mix the substances, and give a first component. 5 g of polyamide 650 and 4 g of toluene solution were uniformly mixed, to give a second component. The first component and the second component were mixed at a ratio of 4:1, and stirred using a high speed stirrer for 30 min, to give a hexagonal boron nitride epoxy compound anticorrosive paint containing 1.0 wt % hexagonal boron nitride. The resulting hexagonal boron nitride epoxy compound anticorrosive paint was sprayed onto a carbon steel substrate, to evaporate the solvent, and then give a hexagonal boron nitride epoxy compound coating having a thickness of about 20 μm.

Example 3

0.13 g of aniline tetramer and 0.5 g of hexagonal boron nitride nanosheet (commercially available, thickness: about 3 nm to 5 nm) were weighed and dispersed in 100 mL of tetrahydrofuran, and ultrasonically processed for 1 hr, to give a hexagonal boron nitride dispersion. The hexagonal boron nitride dispersion was added to 20 g of epoxy resin, 1 g of flatting agent (polydimethylsiloxane), 1 g of antisettling agent (polyamide wax), 2 g of defoamer (modified organosilicone compound), and 6 g of xylene, and magnetically stirred for 30 min, to uniformly mix the substances, and give a first component. 5 g of polyamide 650 and 4 g of xylene solution were uniformly mixed, to give a second component. The first component and the second component were mixed at a ratio of 4:1, and stirred by a high speed stirrer for 30 min, to give a hexagonal boron nitride epoxy compound anticorrosive paint containing 2.0 wt % hexagonal boron nitride. The resulting hexagonal boron nitride epoxy compound anticorrosive paint was sprayed onto a carbon steel substrate, to evaporate the solvent, and then give a hexagonal boron nitride epoxy compound coating having a thickness of about 20 μm.

The hexagonal boron nitride dispersion (left) in Example 1 without processing by oligoaniline was compared with the hexagonal boron nitride dispersion (right) processed by oligoaniline, and the effect was shown in FIG. 1a. The results showed that: the unprocessed hexagonal boron nitride dispersion had obvious precipitation, while the hexagonal boron nitride dispersion did not have obvious precipitation, indicating that the oligoaniline can enable hexagonal boron nitride to be uniformly dispersed in a solvent.

Figure 2A:
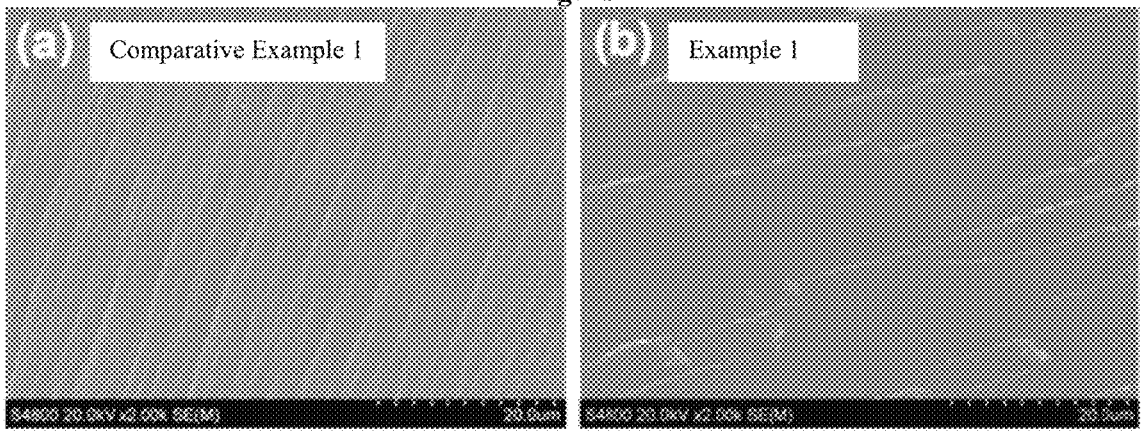
FIG. 2*a* is a scanning electron micrograph of a cross section of a pure epoxy coating obtained in Comparative Example 1.
Figure 2B:
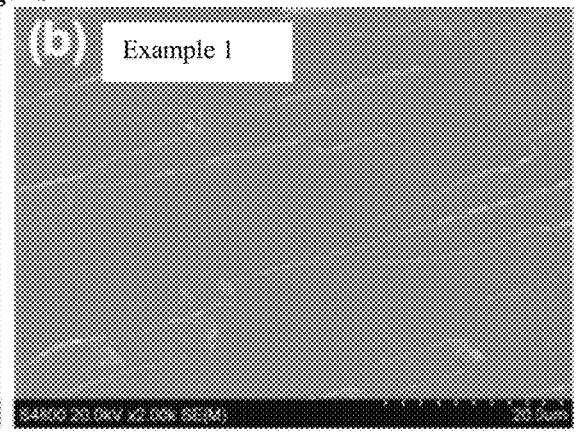
FIG. 2*b* is a scanning electron micrograph of a cross section of a hexagonal boron nitride epoxy compound coating obtained in Example 1.
Figure 2C:
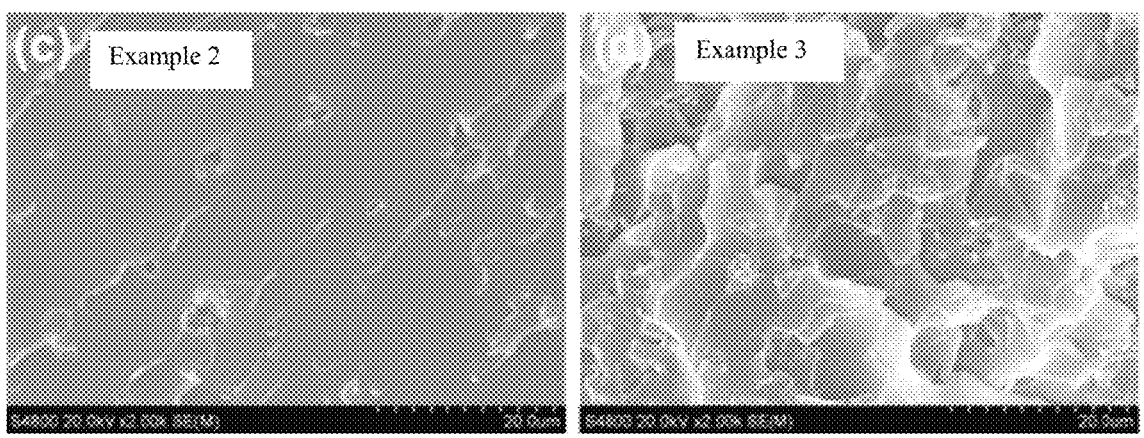
FIG. 2*c* is a scanning electron micrograph of a cross section of a hexagonal boron nitride epoxy compound coating obtained in Example 2.
Figure 2D:
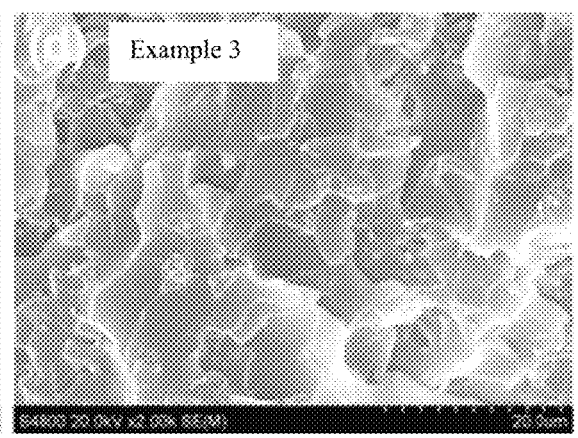
FIG. 2*d* is a scanning electron micrograph of a cross section of a hexagonal boron nitride epoxy compound coating obtained in Example 3.
Figure 2E:
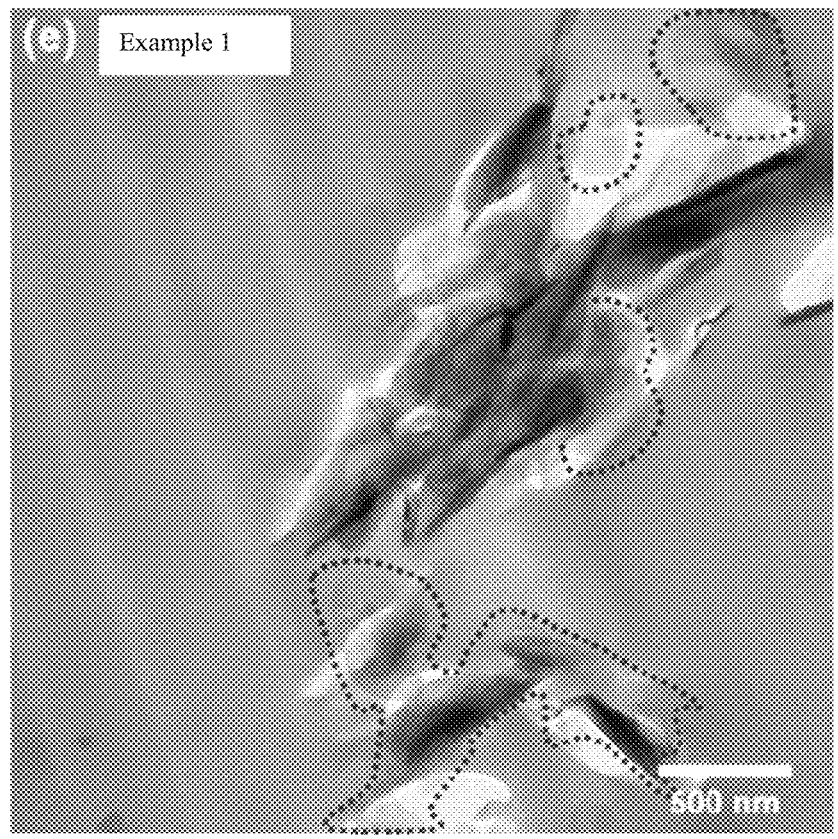
FIG. 2*e* is a transmission electron micrograph of a hexagonal boron nitride epoxy compound coating obtained in Example 1.

A cross section of the pure epoxy coating obtained in Comparative Example 1 and cross sections of the hexagonal boron nitride epoxy compound coatings obtained in Examples 1, 2, and 3 were characterized using a scanning electron microscope. The results showed that: there were many elongated cracks on the cross section of the pure epoxy coating (FIG. 2a); cracks on the cross section of the hexagonal boron nitride epoxy compound coating obtained in Example 1 were reduced (FIG. 2b); and with the increase of the boron nitride content, the cross section became rough, and there were many aggregation defects of hexagonal boron nitride (FIG. 2c and FIG. 2d). FIG. 2e is a transmission electron micrograph of the hexagonal boron nitride epoxy compound coating obtained in Example 1. As can be seen from this figure, there were randomly distributed hexagonal boron nitride nanosheets in the coating, indicating that when the content of hexagonal boron nitride was 0.5 wt %, the presence of the oligoaniline can reduce aggregation of hexagonal boron nitride in the epoxy resin, and promote good dispersion of hexagonal boron nitride in the epoxy resin, while excess hexagonal boron nitride would have partial aggregation phenomenon.

The pure epoxy coating obtained in Comparative Example 1 and the hexagonal boron nitride epoxy compound coatings at different contents obtained in Examples 1, 2, and 3 were electrochemically characterized. Specifically, the hexagonal boron nitride epoxy compound coatings at different contents were immersed in a NaCl solution at a concentration of 3.5 wt % for 60 days. During immersion, alternating current impedance spectra were monitored using electrochemical workstation CHI660E of Shanghai CH Instruments. Potentiodynamic polarization curves were obtained after 60 days of immersion.

Figure 3A:
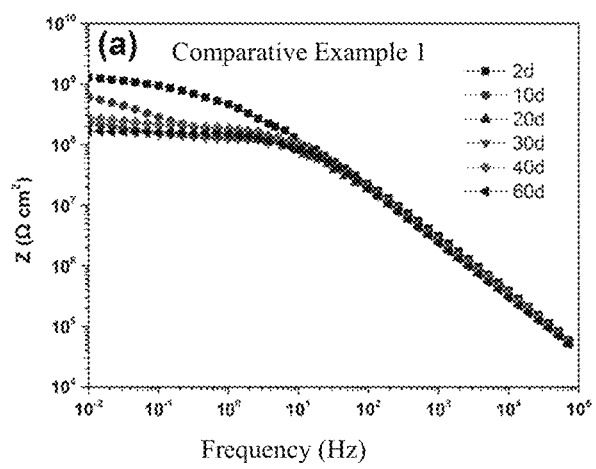
FIG. 3*a* is a bode photo of an alternating current impedance spectrum of a pure epoxy coating obtained in Comparative Example 1 after immersion in a NaCl solution at a concentration of 3.5 wt % for 60 days.
Figure 3B:
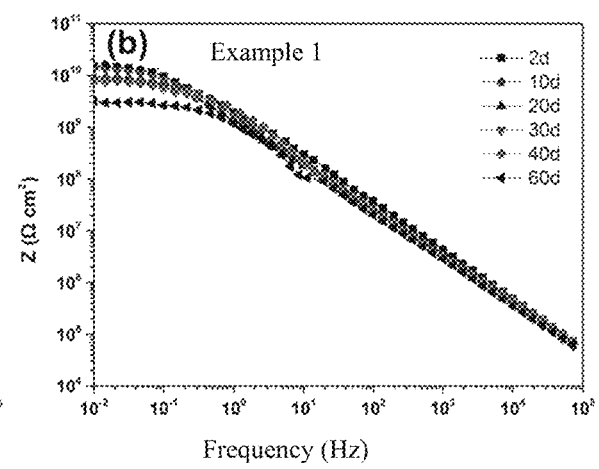
FIG. 3*b* is a bode photo of an alternating current impedance spectrum of a hexagonal boron nitride epoxy compound coating obtained in Example 1 after immersion in a NaCl solution at a concentration of 3.5 wt % for 60 days.
Figure 3C:
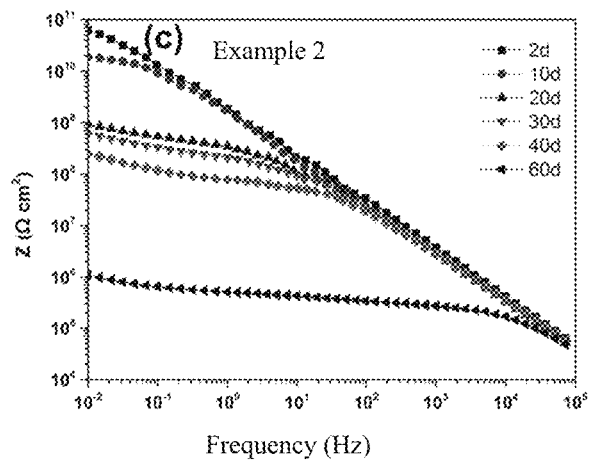
FIG. 3c is a bode photo of an alternating current impedance spectrum of a hexagonal boron nitride epoxy compound coating obtained in Example 2 after immersion in a NaCl solution at a concentration of 3.5 wt % for 60 days.
Figure 3D:
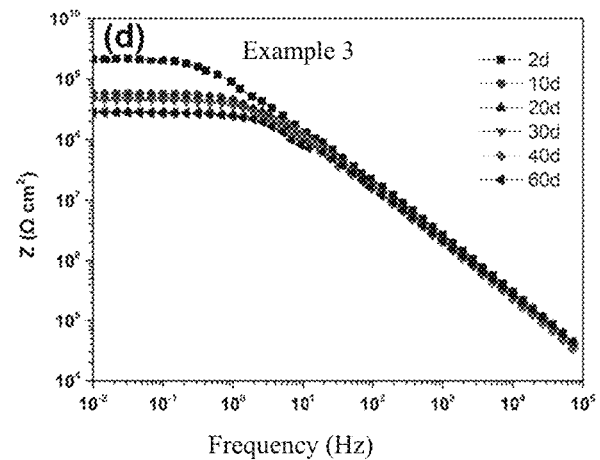
FIG. 3d is a bode photo of an alternating current impedance spectrum of a hexagonal boron nitride epoxy compound coating obtained in Example 3 after immersion in a NaCl solution at a concentration of 3.5 wt % for 60 days.

And the pure epoxy resin coating obtained in Comparative Example 1 was tested for corrosion resistance. As can be seen from FIG. 3a, during 60 days of immersion of the pure epoxy resin, the impedance modulus was continuously reduced from $5.09 \times 10^9$ $\Omega cm^2$ to $3.997 \times 10^5$ $\Omega cm^2$. As shown in FIG. 3b, the impedance modulus of the hexagonal boron nitride epoxy compound coating obtained in the example did not change greatly during immersion, still remained at $2.81 \times 10^8$ $\Omega cm^2$ from $7.54 \times 10^9$ $\Omega cm^2$ after 80 days of immersion, and had excellent corrosion resistance. With the increase of the doping content of hexagonal boron nitride, the impedance of the coating was obviously reduced during 60 days of immersion. In particular, the hexagonal boron nitride epoxy compound coating obtained in Example 2 had failed after 60 days of immersion (FIG. 3c).

Figure 4:
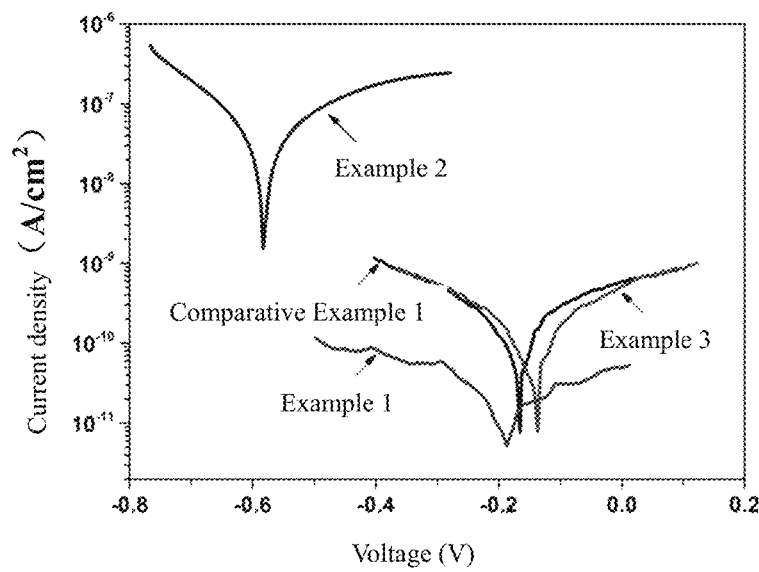
FIG. 4 is a polarization curve of a pure epoxy coating obtained in Comparative Example 1 and polarization curves of hexagonal boron nitride epoxy compound coatings at different contents obtained in Examples 1, 2, and 3 after immersion for 60 days.
Figure 5:
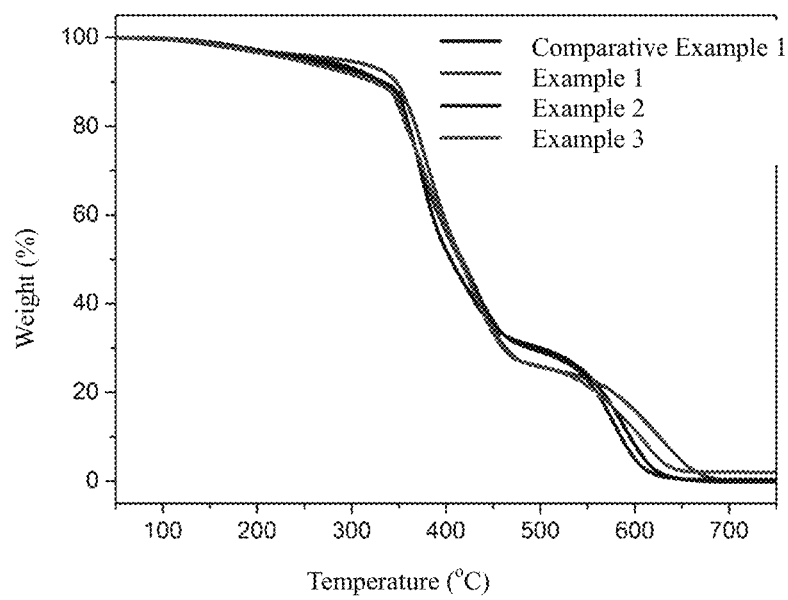
FIG. 5 is a thermogravimetric curve of a pure epoxy coating obtained in Comparative Example 1 and thermogravimetric curves of hexagonal boron nitride epoxy compound coatings at different contents obtained in Examples 1, 2, and 3.

At the same time, samples after 60 days of immersion were tested for potentiodynamic polarization (FIG. 4). It can be found that the hexagonal boron nitride epoxy compound coating obtained in Example 2 showed a high corrosion current density, while among all coatings, the hexagonal boron nitride epoxy compound coating obtained in Example 1 had the lowest corrosion current density. Therefore, it can be said that the hexagonal boron nitride epoxy compound coating obtained in Example 1 showed the best corrosion resistance. This was probably because when the content of hexagonal boron nitride was 0.5 wt %, it was uniformly dispersed in the epoxy resin, to enable the hexagonal boron nitride nanosheet to be better distributed in the epoxy resin layer upon layer, thus significantly enhancing the barrier properties and corrosion resistance of the coating.

In addition to research on corrosion resistance of the epoxy compound coating, thermal performances of the pure epoxy coating obtained in Comparative Example 1 and the hexagonal boron nitride epoxy compound coatings at different contents obtained in Examples 1, 2, and 3 were characterized. The coatings showed similar thermal decomposition behaviors, but after doping with boron hydride, temperatures corresponding to 10% weight loss and 50% weight loss were increased, indicating that improve the thermal stabilities of the coatings were improved.

Figure 6A:
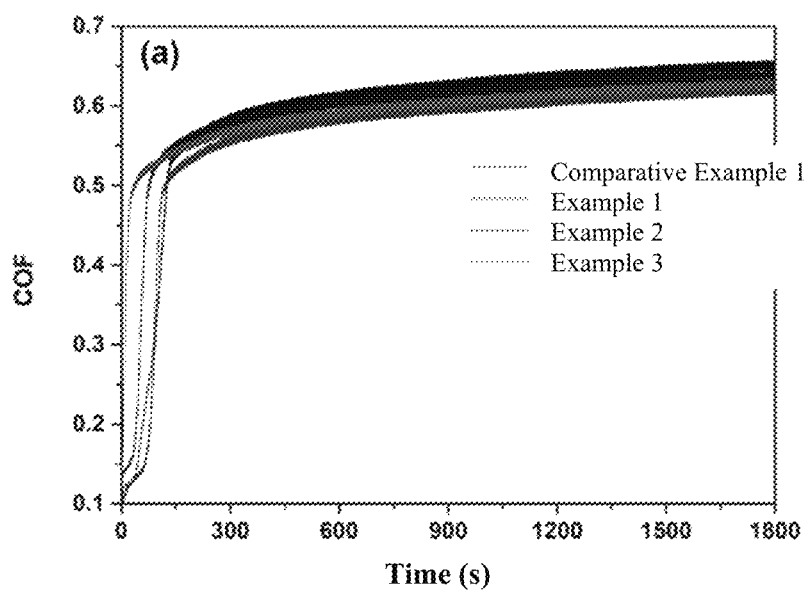
FIG. 6a is a curve of time-varying friction coefficient of a pure epoxy coating obtained in Comparative Example 1 and curves of time-varying friction coefficient of hexagonal boron nitride epoxy compound coatings at different contents obtained in Examples 1, 2, and 3.
Figure 6B:
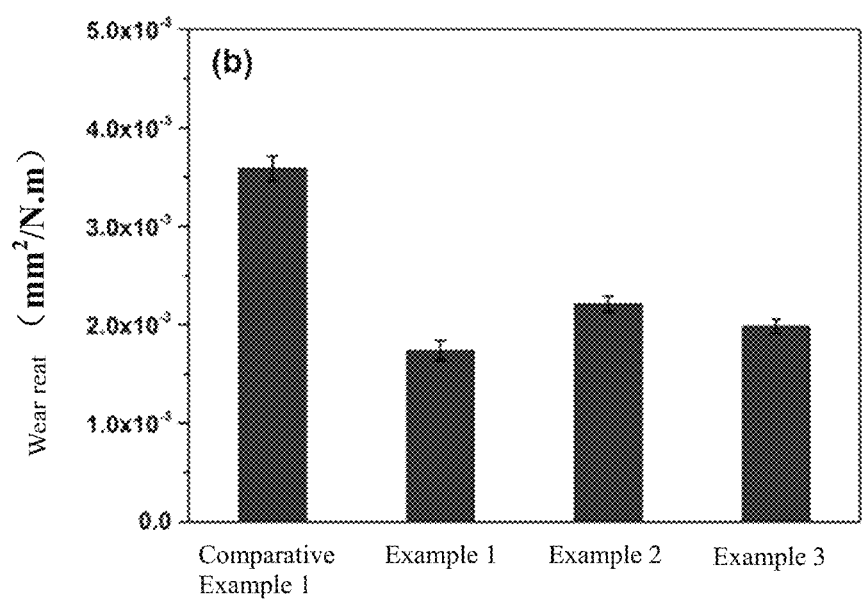
FIG. 6b is a wear rate of a pure epoxy coating obtained in Comparative Example 1 and wear rates of hexagonal boron nitride epoxy compound coatings at different contents obtained in Examples 1, 2, and 3.

In addition, the present disclosure further characterized a wear rate of the pure epoxy coating obtained in Comparative Example 1 and wear rates of the hexagonal boron nitride epoxy compound coatings at different contents obtained in Examples 1, 2, and 3 using a UMT-3 frictional machine under conditions of 2 N load, 1 Hz frequency, and 20 min reciprocating sliding friction. As can be seen from FIG. 6a, the friction coefficients of the coatings obtained in Examples 1 to 3 were not obviously reduced, but the wear resistances of the coatings were obviously improved, compared with the wear resistance of the pure epoxy coating, wherein the compound coating added with 0.5 wt % hexagonal boron nitride had the lowest friction coefficient and wear rate, and obviously improved thermal stability, which will facilitate enabling the coating to still maintain good mechanical properties when generating heat by friction, thereby further improving the wear resistance of the coating.

Comparative Example 2

0.13 g of hexagonal boron nitride nanosheet, 25 mL of tetrahydrofuran, 20 g of epoxy resin, 1 g of flatting agent, 1 g of antisettling agent, 2 g of defoamer, and 6 g of xylene were mixed, and magnetically stirred for 30 min, to uniformly mix the substances, and give a first component. 5 g of polyamide 650 and 4 g of xylene solution were uniformly mixed, to give a second component. The first component and the second component were mixed, and stirred using a high speed stirrer for 30 min, to give an epoxy compound paint containing 0.5 wt % hexagonal boron nitride. The resulting epoxy compound paint was sprayed onto a carbon steel substrate, to evaporate the solvent, and then give an epoxy compound coating having a thickness of about 20 μm.

Comparative Example 3

0.031 g of aniline trimer, 0.13 g of hexagonal boron nitride nanosheet, 25 mL of tetrahydrofuran, 20 g of epoxy resin, 1 g of flatting agent, 1 g of antisettling agent, 2 g of defoamer, and 6 g of xylene were mixed, and magnetically stirred for 30 min, to uniformly mix the substances, and give a first component. 5 g of polyamide 650 and 4 g of xylene solution were uniformly mixed, to give a second component. The first component and the second component were mixed, and stirred using a high speed stirrer for 30 min, to give an epoxy compound paint containing 0.5 wt % hexagonal boron nitride. The resulting epoxy compound paint was sprayed onto a carbon steel substrate, to evaporate the solvent, and then give an epoxy compound coating having a thickness of about 20 μm.

Similarly, the inventors of the present disclosure also characterized cross sections of the epoxy compound coatings obtained in Examples 2 and 3 using a scanning electron microscope. The results showed that: there were still many cracks on the cross section of the epoxy compound coating obtained in Comparative Example 2, and the hexagonal boron hydride nanosheets were seriously accumulated. The cracks on the cross section of the epoxy compound coating obtained in Comparative Example 2 were reduced, compared with the cracks on the cross section of the pure epoxy coating (but still obviously more than the cracks on the cross sections of the coatings in Examples 1 to 3), and the hexagonal boron nitride nanosheets were partially accumulated. And, the test results of the corrosion resistance, wear resistance, thermal stability, etc. all showed that, the corresponding performances of the epoxy compound coating obtained in Comparative Examples 2 and 3 were improved to a certain extent, compared with those of the pure epoxy coating, but were much inferior to those of the coatings obtained in Examples 1 to 3.

Example 4

This example was substantially identical to Example 1, except that: an aniline tetramer, a hexagonal boron nitride microsheet (commercially available, thickness: about 15 nm to 20 nm), xylene (substituting tetrahydrofuran), and aliphatic glycidyl ether epoxy resin were used.

Example 5

This example was substantially identical to Example 2, except that: an aniline pentamer, few-layer hexagonal boron nitride (2 to 5 layers) (thickness: about 5 nm to 10 nm) or multi-layer hexagonal boron nitride (5 to 9 layers) (thickness: about 15 nm to 20 nm), ethyl acetate, and linear phenol formaldehyde epoxy resin were used.

Example 6

This example was substantially identical to Example 3, except that: an aniline hexamer, a hexagonal boron nitride quantum dot, ethanol, and hydroxymethyl bisphenol F epoxy resin were used.

Furthermore, the inventors of the present disclosure also tested the performances of the epoxy compound coatings obtained in the Examples 4 to 6, and the test results showed that these epoxy compound coatings all revealed excellent corrosion resistances, wear resistances, and thermal stabilities.

Example 7

Figure 7:
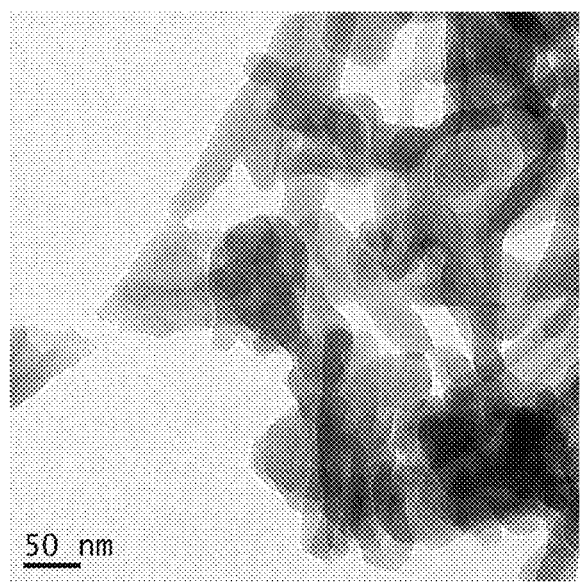
FIG. 7 is a transmission electron micrograph of a polybutylaniline nanofiber employed in Example 7 of the present disclosure.

(1) 0.047 g of polybutylaniline nanofiber (appearance as shown in FIG. 7, can be prepared according to the method hereinbefore), and 0.18 g of hexagonal boron nitride nanosheet (thickness: about 3 to 5 nm) were dispersed in 40 mL of tetrahydrofuran, and ultrasonically processed for 1 hr until uniformly mixing, to give a hexagonal boron nitride dispersion. Then, the hexagonal boron nitride dispersion was added to 30 g of epoxy resin (model E44, purchased from Wujiang Heli Resin Factory), 2 g of flatting agent, 2 g of antisettling agent, 3 g of defoamer, and 8 g of xylene reagent, and magnetically stirred for 30 min, to uniformly mix the substances, and give a first component.

(2) 7.5 g of polyamide 650 and 6 g of xylene solution were uniformly mixed to give a second component.

(3) The first component and the second component were directly mixed, and stirred using a high speed stirrer for 30 min, to give an epoxy compound paint containing 0.5 wt % hexagonal boron nitride.

(4) The resulting hexagonal boron nitride epoxy compound anticorrosive paint was sprayed onto a carbon steel substrate, to evaporate the solvent, and then give a hexagonal boron nitride epoxy compound coating having a thickness of about 20 μm.

Example 8

(1) 0.095 g of poly-o-methylaniline nanofiber (diameter: about 10 nm, length: about 0.8 μm), and 0.38 g of hexagonal boron nitride nanoribbon (thickness: about 8 to 10 nm) were dispersed in 80 mL of tetrahydrofuran, and ultrasonically processed for 1 hr until uniformly mixing, to give a hexagonal boron nitride dispersion. Then, the hexagonal boron nitride dispersion was added to 30 g of epoxy resin (bisphenol S epoxy resin, hydroxymethyl bisphenol F epoxy resin, or hydrogenated bisphenol F epoxy resin), 2 g of flatting agent (polydimethylsilane, polymethylphenylsiloxane, or the like), 2 g of antisettling agent (polyamide wax, organobentonite, or the like), 3 g of polyether defoamer, and 8 g of toluene reagent (model E44, purchased from Wujiang Heli Resin Factory), and magnetically stirred for 30 min, to uniformly mix the substances, and give a first component.

(2) 7.5 g of polyamide 650 and 6 g of toluene solution were uniformly mixed, to give a second component.

(3) The first component and the second component were directly mixed, and stirred using a high speed stirrer for 30 min, to give an epoxy compound paint containing 1.0 wt % hexagonal boron nitride.

(4) The resulting hexagonal boron nitride epoxy compound anticorrosive paint was sprayed onto a carbon steel substrate, to evaporate the solvent, and then give a hexagonal boron nitride epoxy compound coating having a thickness of about 20 μm.

Example 9

(1) 0.19 g of polyethylaniline nanofiber (diameter: about 100 nm, length: about 0.7 μm), and 0.75 g of few-layer hexagonal boron nitride powder were dispersed in 150 mL of tetrahydrofuran, and ultrasonically processed for 1 hr until uniformly mixing, to give a hexagonal boron nitride dispersion. Then, the hexagonal boron nitride dispersion was added to 30 g of epoxy resin (o-cresol formaldehyde epoxy resin, aliphatic glycidyl ether epoxy resin, glycidyl ester epoxy resin, glycidyl amine epoxy resin, or the like), 2 g of flatting agent (polyacrylate, silicone oil, or the like), 2 g of antisettling agent (fumed silica, or the like), 3 g of modified organosilicon polymer defoamer, and 8 g of xylene reagent, and magnetically stirred for 30 min, to uniformly mix the substances, and give a first component.

(2) 7.5 g of polyamide 650 and 6 g of xylene solution were uniformly mixed, to give a second component.

(3) The first component and the second component were directly mixed, and stirred using a high speed stirrer for 30 min, to give an epoxy compound paint containing 2.0 wt % hexagonal boron nitride.

(4) The resulting hexagonal boron nitride epoxy compound anticorrosive paint was sprayed onto a carbon steel substrate, to evaporate the solvent, and then give a hexagonal boron nitride epoxy compound coating having a thickness of about 20 μm.

Comparative Example 4

(1) 30 g of epoxy resin (identical to Example 7), 2 g of flatting agent (identical to Example 7), 2 g of antisettling agent (identical to Example 7), and 3 g of defoamer (identical to Example 7) were dissolved in 8 g of xylene reagent, and magnetically stirred for 30 min, to give a first component.

(2) 7.5 g of polyamide 650 and 6 g of xylene solution were uniformly mixed, to give a second component.

(3) The first component and the second component were directly mixed, and stirred using a high speed stirrer for 30 min, to give a pure epoxy paint.

(4) The resulting pure epoxy paint was sprayed onto a carbon steel substrate, to evaporate the solvent, and then give a pure epoxy coating having a thickness of about 20 μm.

Comparative Example 5

The Comparative Example 5 was substantially identical to Example 7, except that the polybutylaniline nanofiber in the first component was substituted with commercially available poly aniline.

FIG. 8a is a photo of a hexagonal boron nitride dispersion without dispersion processing by the polybutylaniline nanofiber in the Example 7, and FIG. 8b is a typical photo of a hexagonal boron nitride dispersion in the Example 7, wherein hexagonal boron nitride underwent dispersion processing by polybutylaniline. As can be seen, the hexagonal boron nitride dispersion without dispersion processing by the polybutylaniline nanofiber had obvious precipitation, while the hexagonal boron nitride dispersion after dispersion processing by the polybutylaniline nanofiber in the Example 7 did not have obvious precipitation, suggesting that the polybutylaniline nanofiber can enable hexagonal boron nitride to be uniformly dispersed in the solvent.

Please refer to FIGS. 9a to 9d, which are respectively a TEM of a pure epoxy coating obtained in Comparative Example 4 and TEMs of typical hexagonal boron nitride epoxy compound coatings obtained in Examples 7 to 9. The results showed that: the pure epoxy coating had a smooth surface without obvious defects; there were many uniformly distributed white areas (mainly hexagonal boron nitride) on the surface of the typical hexagonal boron nitride epoxy compound coating obtained in Example 7, indicating that the presence of the polybutylaniline nanofiber reduced the aggregation of hexagonal boron nitride in the epoxy resin, and promoted good dispersion of hexagonal boron nitride in the epoxy resin; however, with the increase of the doping content of hexagonal boron nitride, white aggregation areas appeared on the surface (FIG. 9c and FIG. 9d). Appearance of a cross section and a TEM of a slice of the hexagonal boron nitride epoxy compound coating obtained in Comparative Example 5 showed that, hexagonal boron nitride in the coating had obvious agglomeration and nonuniform distribution.

Figure 10:
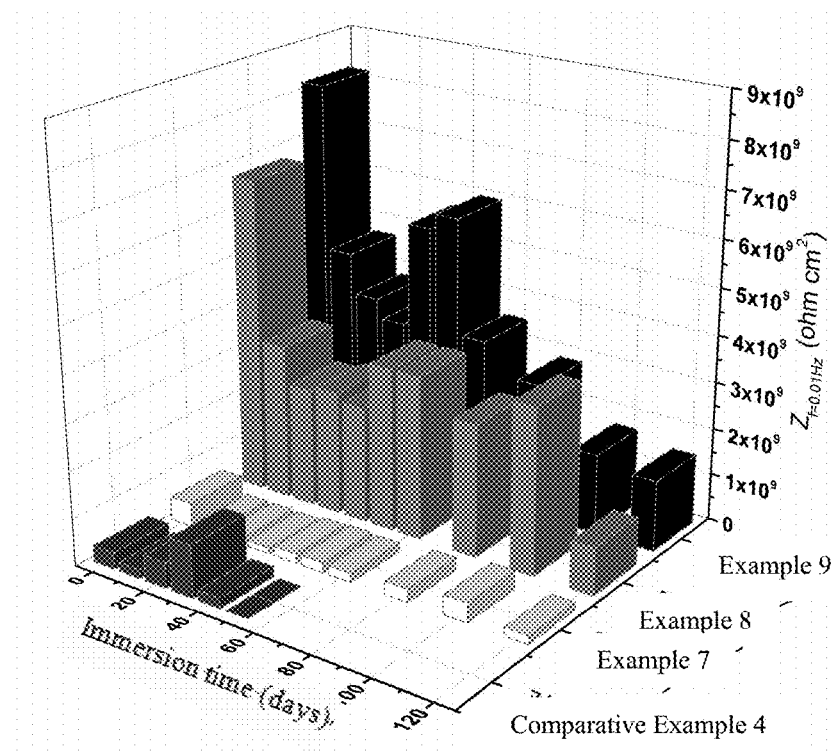
FIG. 10 is a potential polarization curve (bode) of an alternating current impedance spectrum of a pure epoxy coating in Comparative Example 4 and potential polarization curves (bode) of alternating current impedance spectra of hexagonal boron nitride epoxy compound coatings obtained in Example 7 to Example 9 after immersion in a NaCl solution at a concentration of 3.5 wt % for 120 days.

Please refer to FIG. 10, which is a bode photo of an alternating current impedance spectrum of the pure epoxy coating obtained in Comparative Example 4 and bode photos of alternating current impedance spectra of the hexagonal boron nitride epoxy compound coatings at different contents of hexagonal boron nitride obtained in Examples 7 to 9 after immersion in a NaCl solution at a mass fraction of 3.5 wt % for 120 days. Specifically, the hexagonal boron nitride epoxy compound coatings at different contents of the present disclosure were immersed in 3.5 wt % NaCl solution for 120 days. During immersion, open-circuit potential changes and electrochemical alternating current impedance spectra were monitored using electrochemical workstation CHI660E of Shanghai CH Instruments. The pure epoxy coating in Comparative Example 4 was tested for corrosion resistance. As can be seen from FIG. 10, after 50 days of immersion of the pure epoxy resin, the impedance modulus was reduced from $3.5 \times 10^8$ Ωcm$^2$ to $1.1 \times 10^5$ Ωcm$^2$, indicating that the pure epoxy resin had failed. The hexagonal boron nitride epoxy compound coatings at different contents of boron hydride of the present disclosure still remained high impedance after 120 days of immersion, and particularly 0.5 to 1 wt % hexagonal boron nitride epoxy compound coating had an impedance modulus of about $1.0 \times 10^9$ Ωcm$^2$. In addition, the hexagonal boron nitride epoxy compound coatings at different contents of boron nitride of the present disclosure had a trend of increasing impedance modulus during immersion, which may be associated with the presence of the polyaniline nanofiber capable of passivating metal surfaces and forming a protective oxide layer. The hexagonal boron nitride epoxy compound coating obtained in Comparative Example 5 was tested in an identical way. The results showed that it was similar to the pure epoxy coating, its impedance modulus was also significantly reduced after short-time immersion, and its reduction extent was far more than that of the hexagonal boron nitride epoxy compound coatings in Examples 7 to 9.

Figure 11:
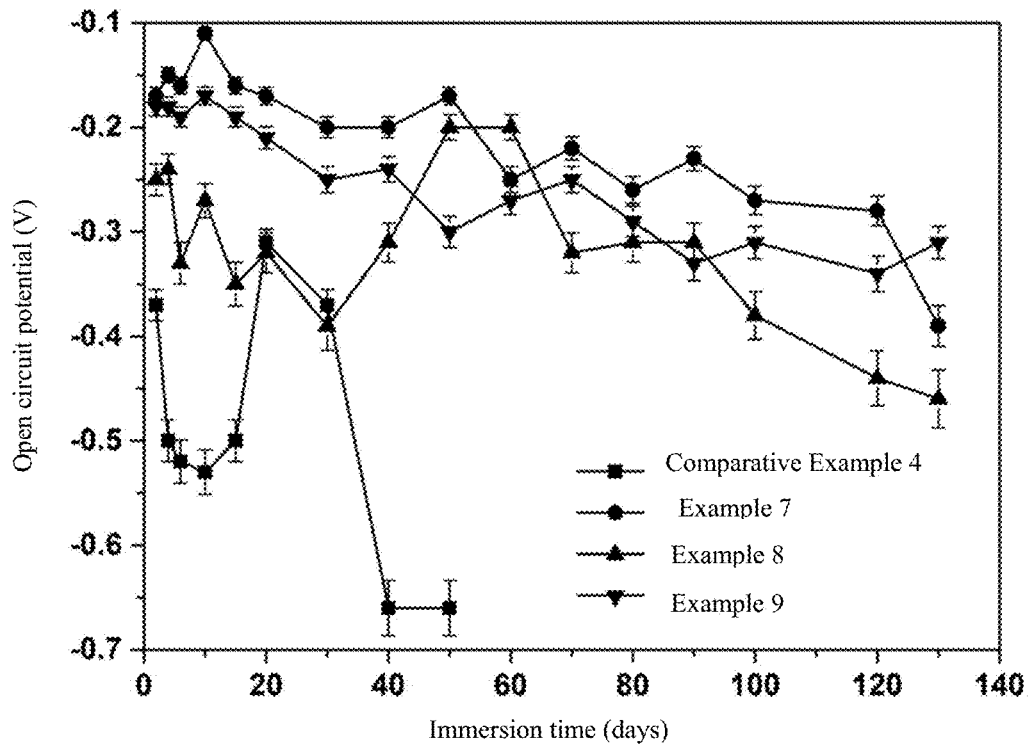
FIG. 11 is a curve of an open circuit potential over immersion time of a pure epoxy coating in Comparative Example 4 and curves of open circuit potentials over immersion time of hexagonal boron nitride epoxy compound coatings obtained in Example 7 to Example 9.

Please refer to FIG. 11, which is a curve of an open circuit potential over immersion time of the pure epoxy coating in Comparative Example 4 and curves of open circuit potentials over immersion time of the hexagonal boron nitride epoxy compound coatings at different contents of boron hydride obtained in Examples 7 to 9. The results showed that: with the extension of immersion time, the open circuit potential was continuously decreased, and relative to the pure epoxy coating, the open circuit potential of the hexagonal boron nitride epoxy compound coating had a positive shift, indicating that occurrence of the corrosion process was more difficult. Then, the hexagonal boron nitride epoxy compound coating obtained in Comparative Example 5 was tested in an identical way. The results showed that its corrosion resistance was improved to a certain extent, compared with that of the pure epoxy coating, but was still far inferior to that of the hexagonal boron nitride epoxy compound coating in Examples 7 to 9.

Figure 12:
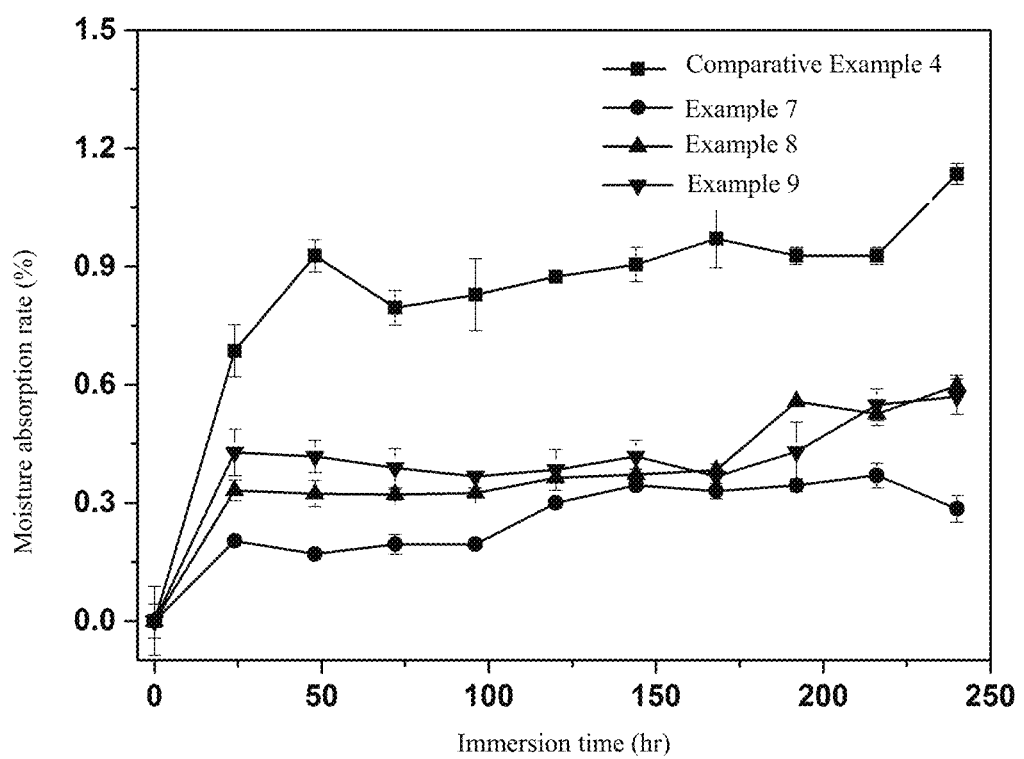
FIG. 12 is a moisture absorption curve of a pure epoxy coating in Comparative Example 4 and moisture absorption curves of hexagonal boron nitride epoxy compound coatings obtained in Example 7 to Example 9.

Please refer to FIG. 12, which is a moisture absorption curve of the pure epoxy coating in Comparative Example 4 and moisture absorption curves of the hexagonal boron nitride epoxy compound coatings at different contents of boron hydride obtained in Examples 7 to 9. The moisture absorption curve of the coating can be divided into two stages: an initial stage and a saturated moisture absorption stage. The pure epoxy coating showed a highest moisture absorption rate (about 1%) after moisture absorption was saturated; while the moisture absorption rates of the hexagonal boron hydride epoxy compound coatings at different contents of boron hydride were obviously reduced, compared with the moisture absorption rate of the pure epoxy coating, indicating that the uniformly dispersed hexagonal boron nitride formed sheet-layer barrier effects in the epoxy coating, and inhibited the dispersion of the corrosive medium in the coating. The above results showed that the excellent corrosion resistance of the hexagonal boron nitride epoxy compound coating may be mainly contributed to by the synergistic effect of the polyaniline nanofiber and the hexagonal boron nitride nanosheet. Then, the hexagonal boron nitride epoxy compound coating obtained in Comparative Example 5 was tested in an identical way. The results showed that its moisture absorption rate was improved to a certain extent, compared with that of the pure epoxy coating, but was still far inferior to that of the hexagonal boron nitride epoxy compound coating in Examples 7, 8, and 9.

Example 10

The example was substantially identical to Example 7, except that the hexagonal boron nitride microsheet in the first component was substituted with hexagonal boron nitride having a thickness of about 20 nm, poly-o-propylaniline nanofiber (diameter: about 300 nm, length: about 5 μm) was used in the first component, and acetone and dimethyl sulfoxide were used as the solvent in the first component and the second component.

Example 11

The example was substantially identical to Example 8, except that the hexagonal boron nitride nanoribbon in the first component was substituted with multi-layer hexagonal boron nitride having a thickness of about 12 to 15 nm, the polyaniline nanofiber (diameter: about 150 nm, length: about 2 μm) was used in the first component, and ethanol and ethyl acetate were used as the solvent in the first component and the second component.

Example 12

The example was substantially identical to Example 9, except that the few-layer hexagonal boron nitride in the first component was substituted with a hexagonal boron nitride quantum dot.

Example 13

The example was substantially identical to Example 7, except that the hexagonal boron nitride nanosheet in the first component was substituted with hydroxylated boron nitride nanosheet having a thickness of about 5 to 8 nm.

Example 14

The example was substantially identical to Example 9, except that the few-layer hexagonal boron nitride in the first component was substituted with fluorinated boron nitride having a thickness of about 10 to 15 nm.

For the hexagonal boron nitride epoxy compound anticorrosive paints and compound coatings obtained in the Example 10 to Example 14, the inventor also tested them in a way identical to that in Example 7 to Example 9. The results showed that, these compound anticorrosive paints all have excellent storage stabilities, and these formed compound coatings all showed good corrosion resistance and barrier properties.

It should be noted that the terms "comprising", "contain" or any other variants thereof in the specification are intended to cover non-exclusive inclusiveness, so that the process, method, article or device including a series of elements includes not only those elements, but also other elements that are not clearly enumerated, or further includes inherent elements for this process, method, article or device.

It should be noted that the above description is only specific embodiments of the present disclosure. For those with ordinary skills in the art, they may still make a number of improvements and modifications without departing from the principle of the present disclosure, and such improvements and modifications shall also be regarded as falling within the scope of protection of the present disclosure.

What is claimed is:

1. A hexagonal boron nitride epoxy compound anticorrosive paint, comprising:
    a first component, comprising hexagonal boron nitride, an epoxy resin, an oligoaniline or a polyaniline nanofiber, a paint additive, and a solvent; and
    a second component, comprising 75 to 100 parts by weight of a curing agent and 0 to 25 parts by weight of a solvent, said solvent being the same solvent present in the first component; and
    wherein the first component and the second component are provided in a mass ratio of 100:10 to 100:80;
    provided that when the oligoaniline is present: the oligoaniline comprises at least one oligomer selected from the group consisting of aniline trimer, aniline tetramer, aniline pentamer, and aniline hexamer; and the first component comprises: 80 to 95 parts by weight of the epoxy resin, 0.5 to 2 parts by weight of the hexagonal boron nitride, 0.25 to 1 part by weight of the oligoaniline, and 5 to 15 parts by weight of the paint additive; and
    provided that when the polyaniline nanofiber is present: the polyaniline of the nanofiber is an unsubstituted polyaniline or at least one substituted polyaniline comprising an amino substituent, a methyl substituent, an ethyl substituent, a propyl substituent, or a butyl substituent; and the hexagonal boron nitride and the polyaniline nanofiber are present in a mass ratio of 1:10 to 10:1.

2. The hexagonal boron nitride epoxy compound anticorrosive paint according to claim 1, wherein the oligoaniline is present, and at least a part of the oligoaniline binds to hexagonal boron nitride by a physical action to enable hexagonal boron nitride to be uniformly dispersed in the paint.

3. The hexagonal boron nitride epoxy compound anticorrosive paint according to claim 2, wherein the hexagonal boron nitride and the oligoaniline are provided in a mass ratio of 1:2 to 2:1.

4. The hexagonal boron nitride epoxy compound anticorrosive paint according to claim 1, wherein the oligoaniline is present.

5. The hexagonal boron nitride epoxy compound anticorrosive paint according to claim 1, wherein the polyaniline nanofiber is present and has a diameter of 10 to 300 nm and a length of 0.5 to 5 μm.

6. The hexagonal boron nitride epoxy compound anticorrosive paint according to claim 1, wherein the polyaniline nanofiber is present, and the polyaniline of the nanofiber is the at least one substituted polyaniline.

7. The hexagonal boron nitride epoxy compound anticorrosive paint according to claim 1, wherein the hexagonal boron nitride comprises any one of hexagonal boron nitride nanosheet or a chemically modified derivative thereof, hexagonal boron nitride microsheet or a chemically modified derivative thereof, hexagonal boron nitride nanoribbon or a chemically modified derivative thereof, layered hexagonal boron nitride having 2 to 5 layers or a chemically modified derivative thereof, layered hexagonal boron nitride having 5 to 9 layers or a chemically modified derivative thereof, and hexagonal boron nitride quantum dot or a chemically modified derivative thereof.

8. The hexagonal boron nitride epoxy compound anticorrosive paint according to claim 1, wherein the hexagonal boron nitride has a thickness of 20 nm or less.

9. The hexagonal boron nitride epoxy compound anticorrosive paint according to claim 1, wherein the epoxy resin comprises at least one resin selected from the group consisting of bisphenol A epoxy resin, bisphenol F epoxy resin, bisphenol S epoxy resin, hydroxymethyl bisphenol F epoxy resin, hydrogenated bisphenol F epoxy resin, nylon modified epoxy resin, linear phenol formaldehyde epoxy resin, o-cresol formaldehyde epoxy resin, aliphatic glycidyl ether epoxy resin, glycidyl ester epoxy resin, and glycidyl amine epoxy resin; and
the curing agent comprises at least one curing agent selected from the group consisting of polyamide curing agent, cardanol curing agent, anhydride curing agent, and imidazole curing agent.

10. The hexagonal boron nitride epoxy compound anticorrosive paint according to claim 1, wherein the paint additive comprises at least one additive selected from the group consisting of antisettling agent, defoamer, and flatting agent.

11. The hexagonal boron nitride epoxy compound anticorrosive paint according to claim 1, wherein the solvent comprises at least one solvent selected from the group consisting of toluene, xylene, acetone, tetrahydrofuran, ethanol, ethyl acetate, and dimethyl sulfoxide.

12. A preparation method of the hexagonal boron nitride epoxy compound anticorrosive paint according to claim 1, comprising:
preparing the first component by: mixing the hexagonal boron nitride with the oligoaniline or polyaniline nanofiber in the solvent, to give a hexagonal boron nitride dispersion, and then uniformly mixing the hexagonal boron nitride dispersion with the epoxy resin and the paint additive; and
preparing the second component by: providing the curing agent and optionally combining the curing agent with the solvent.

13. The preparation method according to claim 12, wherein the first component is prepared by: mixing the hexagonal boron nitride with the oligoaniline in the solvent by stirring or ultrasonic processing, to give the hexagonal boron nitride dispersion, and then uniformly mixing the hexagonal boron nitride dispersion with the epoxy resin and the paint additive.

14. The preparation method according to claim 12, wherein the first component is prepared by: mixing the hexagonal boron nitride with the polyaniline nanofiber in the solvent, to give the hexagonal boron nitride dispersion, and then uniformly mixing the hexagonal boron nitride dispersion with the epoxy resin and the paint additive.

15. A coating formed by the hexagonal boron nitride epoxy compound anticorrosive paint according to claim 1.

* * * * *